Nov. 29, 1949     C. K. BUMP     2,489,951

EXTRUSION APPARATUS

Filed June 22, 1946

INVENTOR
CHARLES K. BUMP
BY *Reuben Schmidt*
ATTORNEY

Patented Nov. 29, 1949

2,489,951

UNITED STATES PATENT OFFICE 2,489,951

EXTRUSION APPARATUS

Charles K. Bump, Hampden, Mass., assignor to Monsanto Chemical Company, St. Louis, Mo., a corporation of Delaware Application June 22, 1946, Serial No. 678,661

5 Claims. (Cl. 18—12)

This invention relates to an apparatus for producing polyvinyl acetal resin sheets having reduced tendency to adhere to surfaces which may be contacted during the handling thereof.

As is known to those skilled in the art, polyvinyl acetal resin sheets have been found to be useful for many purposes, one of the chief uses being that of an interlayer for laminated glass. Among the difficulties which have been encountered in employing polyvinyl acetal resin sheets for this purpose has been the tendency of such sheets to adhere prematurely to the glass while being properly positioned for the laminating operation.

It is an object of this invention to prepare polyvinyl acetal resin sheets having a controlled degree of surface roughness. A further object is to prepare polyvinyl acetyl resin sheets having reduced adhesion to glass at atmospheric pressure. Another object is to provide an apparatus for imparting a uniformly roughened surface to polyvinyl acetal resin sheets.

These and other objects are attained according to this invention by extruding a polyvinyl acetal resin composition through an orifice, at least a portion of the outer extremity of the structure defining said orifice being grooved in the direction of the extrusion. By processing polyvinyl acetal resin compositions into sheets in this manner, it has been found that the surface of the sheet formed while in contact with the grooved surface has substantially reduced superficial adhesion, e. g., tendency to adhere to materials of the same or different composition during the handling thereof, and may be readily positioned onto glass plates or other smooth articles without premature adhesion thereto. This unexpectedly valuable result is apparently due to the ridged configuration imparted to the sheet during the formation thereof.

Suitable types of apparatus embodying the present invention are shown in the accompanying drawings.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings:

Fig. 1 is a top plan view of a portion of an extrusion apparatus similar to that shown and described in U. S. Patent 2,318,469 in which a grooved die blade of the present invention is used in place of a smooth blade, the grooving being greatly enlarged.

Fig. 2 is a sectional view taken on line 2—2 of Fig. 1.

Fig. 3 is an end plan view of a portion of an extrusion apparatus similar to that shown and described in U. S. Patent 2,061,042 in which both of the die lips are grooved, the grooves being greatly enlarged.

Figure 1:
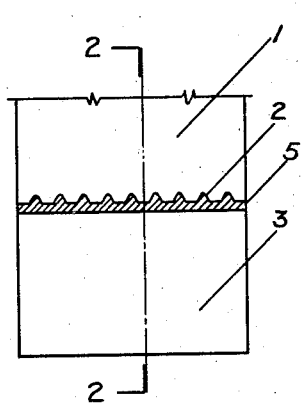
Figure 2:
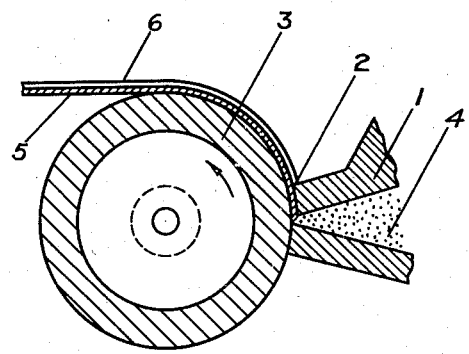

The apparatus of the invention as illustrated in the accompanying drawings comprises extrusion apparatus in which the orifice lips or die blades 1 have grooved surfaces 2. In Figs. 1 and 2, one lip of the orifice comprises a grooved die blade 1 and the other a rotating die roll 3 while in Figs. 3 and 4, both lips of the orifice comprise grooved die blades 1.

In carrying out the process of the invention, polyvinyl acetal plastic material 4 is forced under pressure between the orifice lips in the usual manner to form sheet 5 with ridged surface 6. In the case of apparatus of the type shown in Figs. 1 and 2, rotation of the die roll 3 in the direction indicated by the arrow causes, in addition a certain degree of pulling action on the plastic sheet.

Figure 3:
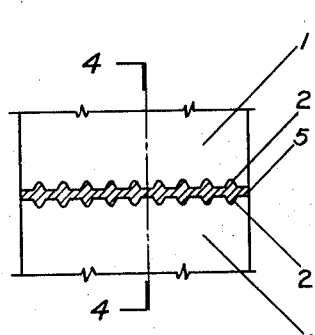
Figure 4:
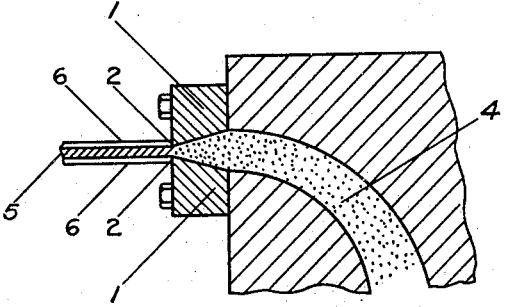
Fig. 4 is a sectional view taken on line 4—4 of Fig. 3.
Figure 5:
Fig. 5 is an enlarged end elevational view of a portion of a grooved die lip or blade of the invention.
Figure 6:
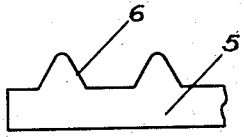
Fig. 6 is an enlarged end elevational view of a portion of a polyvinyl acetal resin sheet showing the configuration imparted by the use of the die blade shown in Figs. 1 and 2.

In Figs. 1 and 3, sheets with ridges imparted thereto by the grooved die blades are shown at the point of emergence from the orifices.

Various types of extrusion apparatus embodying the principles of the invention may be used in place of the apparatus shown in the drawings. For example, instead of a rotating roll, the portion of the orifice opposite to the die blade may be a portion of a moving endless belt as shown in U. S. 2,327,762 and U. S. 2,315,477. Another suitable apparatus which may be adapted for use in the present invention is that shown in U. S. 1,881,917 which comprises a hollow head having a central opening and a mandrel projecting into said opening. Still another apparatus is that shown in U. S. 1,844,972 in which the orifice is defined by a fixed member and a rotating roll.

As is known to those skilled in the art, the extrusion of a plastic composition may be carried out under substantially varied conditions of temperature and pressure. Furthermore, by proper adjustment of temperature and pressure even when using a smooth die blade, sheets may be produced with a certain degree of surface roughness due to a "dragging" effect as the plastic passes through the orifice. This is especially the case when the other die lip comprises a moving surface such as a die roll as shown in Figs. 1 and 2. However, surface roughness of this type is very difficult to control so that the result is not particularly satisfactory. Accordingly, a particular advantage of the invention resides in the fact that sheets with controlled and substantially uniform surface configuration are readily prepared.

Among the advantages of polyvinyl acetal sheets made according to the invention is their freedom from strains such as are likely to be introduced when attempts are made to impart a roughened surface to preformed sheets by molding, calendering and like operations. Thus, by operating according to the invention, the surface configuration is imparted to one or both surfaces simultaneously with the formation of the sheet.

In contrast to the process of the invention, when a surface configuration is imparted to a sheet by calendering between etched rolls or the like, a surface roughness having undesirable characteristics is likely to be imparted. For example, a certain degree of tearing occurs on separation from the roll which tends to result in undercuts. The surfaces resulting from such treatment are much more difficult to wash free of foreign matter such as sodium bicarbonate or other materials used to prevent adhesion of the sheets during storage.

Various types of polyvinyl acetal resin compositions may be used in the process of this invention. Such compositions have been extensively described in the art and numerous types are available on the market. Such compositions usually comprise a mixture of a polyvinyl acetal resin made from one or more aldehydes and containing suitable plasticizing material. One of the principal types which has been employed in the laminated glass art is plasticized polyvinyl butyraldehyde acetal resin.

Such compositions vary to some extent with the nature of the acetal resin and the nature and amount of plasticizer associated therewith. Accordingly, slight variations in the type of extrusion apparatus employed and the nature of the grooves engraved or otherwise formed in the die blades or other orifice structure may be required, depending on the particular composition employed. However, for most purposes, it is found that grooving with the following characteristics is suitable.

While grooves may vary substantially in depth, it is usually preferred that the depth be between 0.001 inch and 0.025 inch and the distance between the centers of the grooves is preferably between 0.005 and 0.01 inch. The configuration of the grooves may be widely varied, although it is preferred that there be no undercutting and when the grooves are triangular in configuration, that the sides define an angle of not less than 30° and preferably not less than 60°. In addition, it is preferred, as shown in the drawings, that the bottom of the grooves be relatively blunt. Aside from such preferred characteristics, the configuration of the grooves may vary widely as pointed out above. For example, a section taken transversely may show a groove outline corresponding to a section from a circle, an ellipse, a triangle, a rectangle or other geometric pattern.

According to a preferred embodiment of the invention, the grooves in the die blade are not unduly deep with reference to their width at the surface of the blade. Thus, a ratio of base width to depth of from 1:1 to 3:1 is usually preferred.

The length of the grooves is not especially critical although there is generally no need to exceed the minimum required to produce sheets with the desired configuration. Usually a groove length of ¼–½ inch is sufficient for a stationary die lip, although die lips with longer grooves may be used.

In one type of suitable die blade are engraved triangular grooves with the apex of the triangle blunted, the grooves being 0.003 inch deep and 0.010 inch apart between centers, with the side of the grooves at an angle of 90° to each other. Another suitable die blade contains the same type of grooving, the grooves being 0.005 inch deep and 0.015 inch between centers. Such die blades are particularly useful in extrusion apparatus of the type illustrated by Figs. 1 and 2 when extruding polyvinyl butyraldehyde acetal resins plasticized with 35–40 parts of dibutyl sebacate and other acetal resin compositions of like plasticity.

Sheets prepared according to this invention may have various thicknesses depending on their ultimate use. For example, the sheets may be 0.005–0.5 inch or more in thickness.

Figure 10:
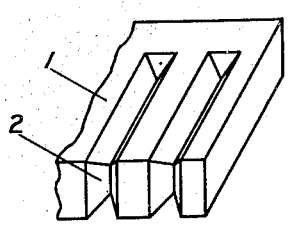
Fig. 10 is an enlarged perspective view of a portion of a grooved die blade with the grooving extended part way up the front or unopposed surface of the blade.
Figure 7:
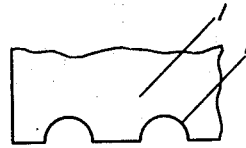
Figs. 7 and 8 are enlarged end elevational views of portions of die blades having grooves of varying configuration.
Figure 9:
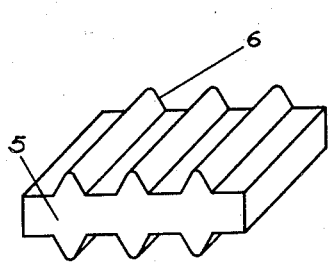
Fig. 9 is an enlarged perspective view of a polyvinyl acetal resin sheet to both surfaces of which a grooved surface has been imparted according to the present invention.
Figure 8:
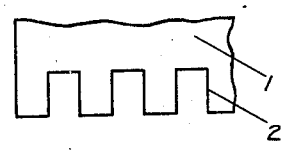

According to another embodiment of the invention, particularly when a die blade with shallow grooving, e. g., 0.001–0.005 inch in depth, is used, the grooving is extended along the front or unopposed surface of the die blade for a short distance, e. g., 0.01–0.03 inch as shown in Fig. 10. The use of such a die blade permits greater latitude in extrusion pressures since without this feature, the use of excessive pressure unexpectedly results in sheets with little or none of the groove configuration imparted thereto at lower pressures.

The foregoing description is given in illustration and not in limitation of the invention as set forth in the appended claims.

What is claimed is:

1. A device for extruding polyvinyl acetal resin sheets having reduced superficial adhesion, which comprises an orifice-defining structure, at least a portion of the outer extremity thereof being a member grooved in the direction of extrusion with the grooving continued along the unopposed surface of said member.

2. A device as defined in claim 1, in which the grooved member is a grooved die blade.

3. A device as defined in claim 1, in which one of the broad surfaces of the orifice is defined by a continuously moving member and the other broad surface is defined by a grooved die blade.

4. A device as defined in claim 1, in which one of the broad surfaces of the orifice is defined by a rotating die roll and the other broad surface is defined by a grooved die blade.

5. A device as defined by claim 1, in which the broad surfaces of the orifice are defined by grooved die blades.

CHARLES K. BUMP.

REFERENCES CITED

The following references are of record in the file of this patent:

UNITED STATES PATENTS

| Number | Name | Date |
|---|---|---|
| 454,030 | Clark | June 16, 1891 |
| 726,530 | Hamm | Apr. 28, 1903 |
| 1,276,821 | Stevens | Aug. 27, 1918 |
| 1,444,911 | Goodenberger | Feb. 13, 1923 |
| 1,661,069 | Hartung | Feb. 28, 1928 |
| 2,090,404 | Parkhurst | Aug. 17, 1937 |
| 2,330,282 | Hazeltine et al. | Sept. 28, 1943 |